US012650693B2

(12) United States Patent
Islam et al.

(10) Patent No.: US 12,650,693 B2
(45) Date of Patent: Jun. 9, 2026

(54) VIRTUAL ENVIRONMENT CREATION FOR VEHICLE TELEOPERATION

(71) Applicant: GM GLOBAL TECHNOLOGY OPERATIONS LLC, Detroit, MI (US)

(72) Inventors: Md Mhafuzul Islam, West Bloomfield, MI (US); Paolo Giusto, Brentwood, CA (US); Bo Yu, Novi, MI (US); Prakash M. Peranandam, Rochester Hills, MI (US); Ramesh Sethu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 46 days.

(21) Appl. No.: 18/771,894

(22) Filed: Jul. 12, 2024

(65) Prior Publication Data

US 2026/0016821 A1     Jan. 15, 2026

(51) Int. Cl.
*G05D 1/224*          (2024.01)

(52) U.S. Cl.
CPC .................................. *G05D 1/2245* (2024.01)

(58) Field of Classification Search
None
See application file for complete search history.

(56) References Cited

U.S. PATENT DOCUMENTS

2016/0139594 A1* 5/2016 Okumura .............. B60W 30/00
                                                                 701/2
2017/0192423 A1* 7/2017 Rust ..................... G05D 1/0212

2018/0136651 A1* 5/2018 Levinson ............. G05D 1/0027
2019/0196464 A1* 6/2019 Lockwood ........... G05D 1/0022
2024/0028031 A1* 1/2024 Kentley-Klay ........ B60Q 1/543

FOREIGN PATENT DOCUMENTS

DE        102015118489 A1    5/2016
DE        102022129929 A1    6/2023

* cited by examiner

*Primary Examiner* — Rachid Bendidi
*Assistant Examiner* — Nada Mahyoob Alqaderi
(74) *Attorney, Agent, or Firm* — Ingrassia Fisher & Lorenz, LLP | IF&L

(57)          ABSTRACT

A system for generating a virtual environment for use in a vehicle remote teleoperation system including an environmental sensor for detecting an environmental condition proximate to the host vehicle, a sensor configured to generate a sensor data representative of an environment proximate to the host vehicle, a camera configured to capture an image data representative of the environment proximate to the host vehicle, and a processor configured to determine a network condition, generate a modulated data including the image data and the sensor data in response to the environmental condition being less than an environmental threshold value and the network condition exceeding a network threshold condition and to generate the modulated data without the image data in response to at least one of the environmental condition exceeding the threshold value and the network condition not exceeding the network threshold condition.

16 Claims, 5 Drawing Sheets

100

300

500

VIRTUAL ENVIRONMENT CREATION FOR VEHICLE TELEOPERATION

INTRODUCTION

The present disclosure generally relates to systems and methods for remote vehicle teleoperation of a vehicle, and more particularly relates to a method and apparatus for regulation of data transmission in response to communication system conditions and vehicle operating conditions.

Remote vehicle operation systems (RVOs) offer potential benefits such as increased safety, increased efficiency and general convenience to vehicle operators. Remotely controlled vehicles can operate in hazardous environments, such as contaminated areas, and can automate part of the driving task where less human intervention is required, such as driving on highways. These systems allow for a driver or operator to maneuver a vehicle from a remote location with vehicle data being transmitted from the vehicle to the user and control data being transmitted from the user to the vehicle. Current RVO systems, however, have limitations related to user interaction and safety. They typically require continuous user input throughout the driving operation. These limitations highlight the need for improved RVO systems that address the issues of continuous communication, operator distraction, and false user inputs.

Future advancements should focus on developing systems that maintain safety while offering a more user-friendly and reliable experience. One of the major challenges is latency. The time it takes for the remote operator to see a situation, react, and send a signal to the car can be disastrous at high speeds. By the time the car gets the message, the situation on the road could have completely changed. Additionally, the operator relies on cameras and sensors for information, introducing a potential disconnect compared to a driver physically in the car. This can lead to misinterpretations and delayed responses. In addition, communication of large amounts of data between the vehicle and the vehicle control station can prove challenging when network bandwidth can be variable. Sufficient network bandwidth ensures smooth and rapid transmission of data between the vehicle control station and the vehicle. This is critical for two main reasons. First, critical vehicle sensor data and vehicle control data are transmitted allowing for timely vehicle data and corresponding vehicle maneuvers. Second, high bandwidth allows for the transmission of high-resolution video feeds from the vehicle's cameras allowing the user to accurately perceive the environment and react appropriately. Typically if adequate network bandwidth is not available, the vehicle will go into a safe mode, such as shutting down or driving the vehicle to a nearby safe location, such as a roadway shoulder. Accordingly, it is desirable to provide improved systems and methods for transmitting and receiving data between a remote controlled vehicle and a remote vehicle control station. Furthermore, other desirable features and characteristics of the present invention will become apparent from the subsequent detailed description and the appended claims, taken in conjunction with the accompanying drawings and the foregoing technical field and background.

SUMMARY

Disclosed herein are vehicle sensor methods and systems and related control logic for provisioning vehicle systems, methods for making and methods for operating such systems, and motor vehicles equipped with onboard control systems. By way of example, and not limitation, there is presented various embodiments of systems for virtual environment creation for vehicle teleoperation in a remote control station and a motor vehicle are disclosed herein.

In accordance with an exemplary embodiment, the vehicle control system includes, an apparatus for generating a virtual environment for use in control of a host vehicle including an environmental sensor for detecting an environmental condition proximate to the host vehicle, a sensor configured to generate a sensor data representative of an environment proximate to the host vehicle, a camera configured to capture an image representative of the environment proximate to the host vehicle, a processor configured to determine a network condition, generate a modulated data including the image and the sensor data in response to the environmental condition being less than an environmental threshold value and the network condition exceeding a network threshold condition and to generate the modulated data without the image in response to at least one of the environmental condition exceeding the environmental threshold value and the network condition not exceeding the network threshold condition, a transceiver configured to transmit the modulated data to a remote control station and receive a vehicle control data from the remote control station, and a vehicle controller for controlling the host vehicle in response to the vehicle control data.

In accordance with an aspect of the exemplary embodiment, an apparatus wherein the processor is further configured to generate the virtual environment in response to the sensor data and wherein the modulated data includes the virtual environment for display on the remote control station.

In accordance with an aspect of the exemplary embodiment, an apparatus wherein the processor is further configured to generate a virtual environment in response to the sensor data and wherein a resolution of the virtual environment is determined in response to a magnitude of the network condition.

In accordance with an aspect of the exemplary embodiment, an apparatus wherein the environmental condition is a visibility determined in response to the image.

In accordance with an aspect of the exemplary embodiment, an apparatus wherein the network condition is a bandwidth of a communications network.

In accordance with an aspect of the exemplary embodiment, an apparatus wherein the network condition is a bit error rate of a communications network.

In accordance with an aspect of the exemplary embodiment, an apparatus wherein the modulated data includes an object list and wherein each of a plurality of objects listed in the object list are represented as a bounding box.

In accordance with an aspect of the exemplary embodiment, an apparatus wherein the modulated data includes an object list and wherein each of a plurality of objects listed in the object list are represented as one of a plurality of bounding boxes and wherein a size of each of the plurality of bounding boxes is inversely proportional to a magnitude of the network condition.

In accordance with an aspect of the exemplary embodiment, an apparatus wherein the modulated data includes an object list and wherein at least one of a plurality of objects listed in the object list are represented as a bounding box representing a cluster of objects within the environment proximate to the host vehicle.

In accordance with an aspect of the exemplary embodiment, a method for generating a virtual environment for use in control of a host vehicle including determining an environmental condition in response to a sensor data representative of an environment proximate to the host vehicle, determining a network condition in response to a transceiver performance data, capturing an image of the environment proximate to the host vehicle, generating, by a processor, a modulated data including the image and the sensor data in response to the environmental condition being less than a threshold value and the network condition exceeding a threshold network performance level and to generate the modulated data without the image in response to at least one of the environmental condition exceeding the threshold value and the network condition being less than the threshold network performance level, and transmitting the modulated data to a remote control station, receiving a vehicle control data from the remote control station, and a vehicle controller for controlling the host vehicle in response to the vehicle control data.

In accordance with an aspect of the exemplary embodiment, a method wherein generating the modulated data further includes generating the virtual environment in response to the sensor data and wherein the modulated data includes the virtual environment for display on the remote control station.

In accordance with an aspect of the exemplary embodiment, a method wherein generating the modulated data further includes generating a virtual environment in response to the sensor data and wherein a resolution of the virtual environment is determined in response to a magnitude of the network condition.

In accordance with an aspect of the exemplary embodiment, a method wherein the environmental condition is a visibility determined in response to a saturation level of the image.

In accordance with an aspect of the exemplary embodiment, a method wherein the modulated data includes an object list and wherein each of a plurality of objects listed in the object list are represented as a bounding box.

In accordance with an aspect of the exemplary embodiment, a method wherein the modulated data includes an object list and wherein at least one of a plurality of objects listed in the object list are represented as a bounding box representing a cluster of objects within the environment proximate to the host vehicle.

In accordance with an aspect of the exemplary embodiment, a method wherein the modulated data includes an object list and wherein each of a plurality of objects listed in the object list are represented as a one of a plurality of bounding boxes and wherein a size of each of the plurality of bounding boxes is inversely proportional to a magnitude of the network condition.

In accordance with an aspect of the exemplary embodiment, a method wherein the network condition is determined in response to a network condition indicator received from the remote control station.

In accordance with an aspect of the exemplary embodiment, a method wherein the modulated data is further generated in response to a request from the remote control station to exclude the image from the modulated data.

In accordance with an aspect of the exemplary embodiment, a system for generating a virtual environment for use in a vehicle remote teleoperation system for control of a host vehicle including an environmental sensor for detecting an environmental condition proximate to the host vehicle, a sensor configured to generate a sensor data representative of an environment proximate to the host vehicle, a camera configured to capture an image data representative of the environment proximate to the host vehicle, a processor configured to determine a network condition, generate a modulated data including the image data and the sensor data in response to the environmental condition being less than an environmental threshold value and the network condition exceeding a network threshold condition and to generate the modulated data without the image data in response to at least one of the environmental condition exceeding the environmental threshold value and the network condition not exceeding the network threshold condition, a transceiver configured to transmit the modulated data to a remote control station and receive a vehicle control data from the remote control station, and a vehicle controller for controlling the host vehicle in response to the vehicle control data.

In accordance with an aspect of the exemplary embodiment, a system wherein the modulated data includes an object list and wherein each of a plurality of objects listed in the object list are represented as one of a plurality of bounding boxes and wherein a size of each of the plurality of bounding boxes is inversely proportional to a magnitude of the network condition and wherein at least one of the plurality of objects listed in the object list represents a cluster of objects within the environment proximate to the host vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
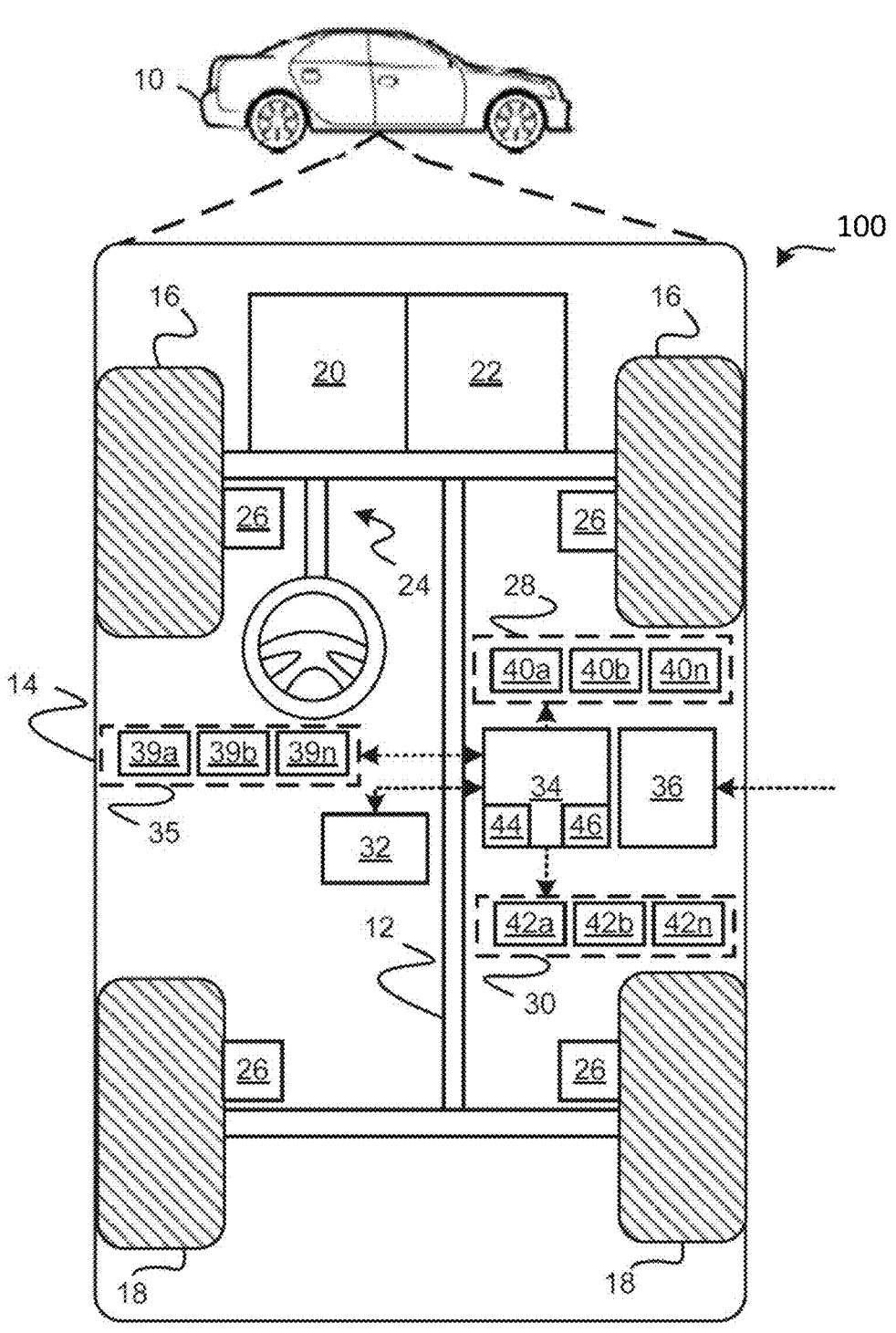
FIG. 1 shows an exemplary vehicle system for virtual environment creation for vehicle teleoperation in accordance with various embodiments.

Turning now to FIG. 1, an exemplary vehicle system 100 for virtual environment creation for vehicle teleoperation is shown in accordance with various embodiments. The exemplary system 100 includes vehicle 10 having a plurality of sensing devices 40a-40n, a propulsion system 20, a transmission system 22, a steering system 24, a brake system 26, a sensor system 28, an actuator system 30, at least one data storage device 32, at least one controller 34, and a communication system 36.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the vehicle may be a non-autonomous vehicle where the human driver requires remote support to drive the vehicle for a period of time and is not limited to the present examples.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors.

In various embodiments, the sensing devices 40a-40n are disposed at different locations of the vehicle 10. In exemplary embodiments described herein, one or more of the sensing devices 40-40n are realized as lidar devices. In this regard, each of the sensing devices 40a-40n may include or incorporate one or more lasers, scanning components, optical arrangements, photodetectors, and other components suitably configured to horizontally and rotatably scan the environment in the vicinity of the vehicle 10 with a particular angular frequency or rotational velocity. In exemplary embodiments described herein, one or more of the sensing devices 40a-40n are realized as optical cameras configured to capture images of the environment in the vicinity of the vehicle 10.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
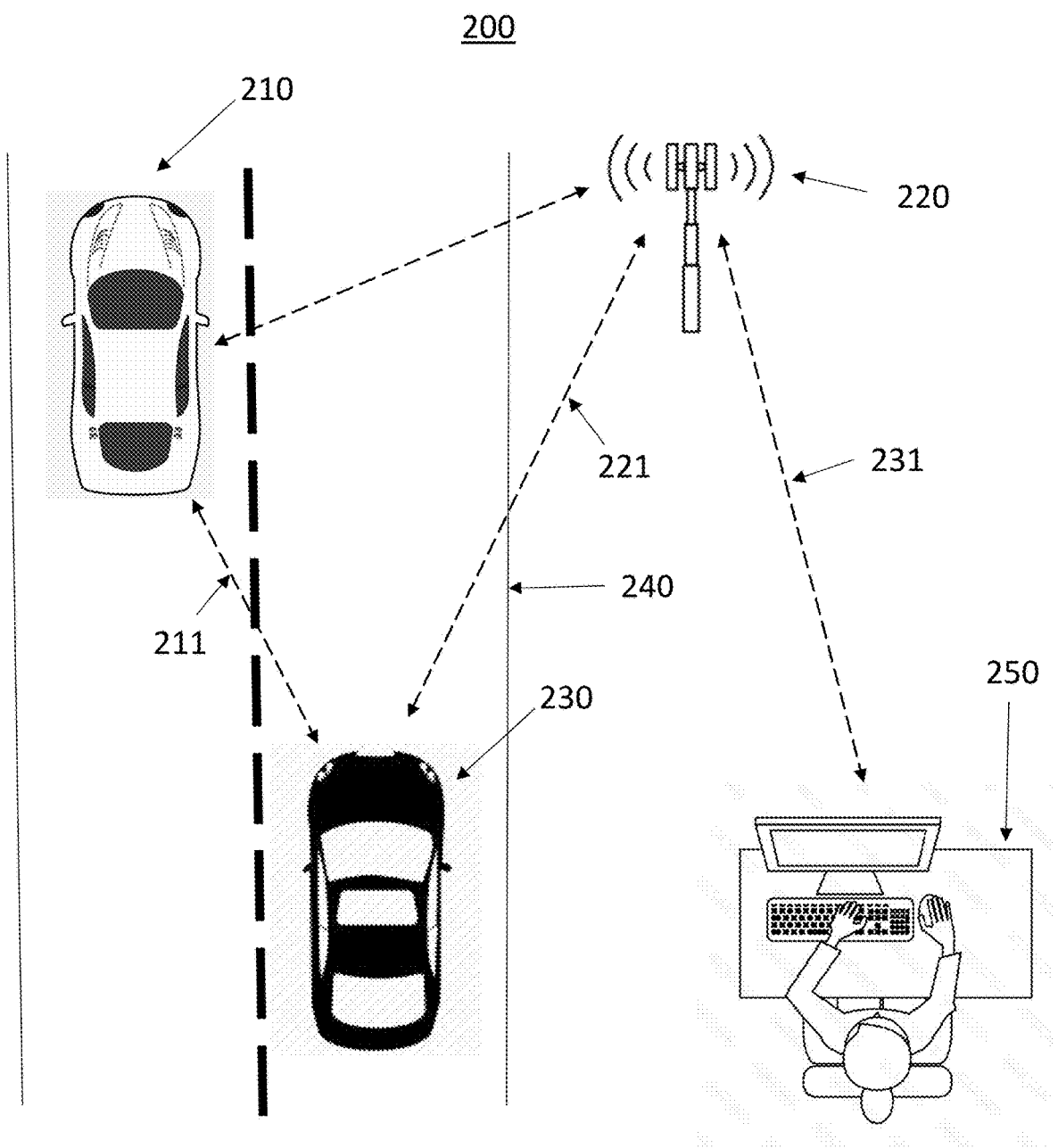
FIG. 2 shows an exemplary environment for virtual environment creation for vehicle teleoperation in accordance with various embodiments.

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, and/or remote control stations (RCS) (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. In some exemplary embodiments, this process can be carried out prior to the vehicle operating in its environment. In various embodiments, the data storage device 32 stores calibrations for use in aligning the sensing devices 40a-40n. In various embodiments, one or more of the calibrations are estimated as extrinsic parameter using the methods and systems described herein. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In various embodiments, one or more instructions of the controller 34 are embodied in the control system 100 and, when executed by the processor 44, cause the processor 44 to perform the methods and systems that dynamically align the sensor devices by updating calibrations stored in the data storage device 32 as described in greater detail below.

In accordance with various embodiments, the controller 34 implements an autonomous driving system (ADS). Software and/or hardware components of the controller 34 (e.g., processor 44 and computer-readable storage device 46) are utilized to provide an autonomous driving system that is used in conjunction with vehicle 10, for example, to automatically control various actuators 30 onboard the vehicle 10 to thereby control vehicle acceleration, steering, and braking, respectively, without human intervention.

In various embodiments, the instructions of the autonomous driving system 70 may be organized by function or system. For example, the autonomous driving system can include a computer vision system, a positioning system, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. In various embodiments, the computer vision system 74 receives information from and/or implements the control system 100 described herein.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Turning now to FIG. 2, an exemplary environment 200 for virtual environment creation for vehicle teleoperation is shown in accordance with various embodiments. The exemplary environment 200 includes a proximate vehicle 210, a host vehicle 230, a road surface 240, a roadside unit (RSU) 220 and an RCS 250. Teleoperation of vehicles is seen as a potential solution for providing remote assistance to advanced driver assistance system (ADAS) equipped vehicles in situations where they encounter difficulty or require human intervention. The RCS 250 can act as an extension of the remote vehicle operator, allowing them to control and interact with the host vehicle 230 as if they were physically present.

An ADAS equipped vehicle is a vehicle that is capable of sensing its environment and navigating with little or no user input. An ADAS equipped vehicle senses its environment using sensing devices such as radar, lidar, image sensors, and the like. The ADAS equipped vehicle system can further use information from global positioning systems (GPS) technology, navigation systems, vehicle-to-vehicle (V2V) communication, vehicle-to-infrastructure (V2I) technology, and/or drive-by-wire systems to navigate the vehicle. Vehicle automation has been categorized into numerical levels ranging from zero, corresponding to no automation with full human control, to five, corresponding to full automation with no human control. Various ADAS, such as cruise control, adaptive cruise control, and parking assistance systems correspond to lower automation levels, while true "driverless" or autonomous vehicles correspond to higher automation levels.

In some exemplary embodiments, the host vehicle 230 can use various sensors, data onboard memory V2V communication 211 to receive data, such as image, sensor or mapping data, from one or more the proximate vehicles 210. Data received via V2V communication 211 can include precise information on the location, speed, and direction of one or more proximate vehicles 210. Additionally, V2V communication 211 can provide details on the braking status, turn signals, and even hazard warnings from proximate vehicles 210. By incorporating this collaborative data stream, the host vehicle 230 can make more informed decisions, such as anticipating maneuvers of surrounding vehicles, mitigating potential collisions, and optimizing traffic flow for enhanced safety and efficiency.

Likewise, the host vehicle 230 can receive data via V2I communication 221 to augment its situational awareness to improve its decision-making processes. This data can include real-time traffic signal timing, enabling optimized vehicle speeds for smoother stops and reduced brake wear. RSUs 220, such as roadside sensors, can transmit information on upcoming hazards, such as accidents or disabled vehicles, allowing for rerouting or speed adjustments to improve traffic flow. V2I communication 221 can even provide details on weather conditions along the route, including slippery roads or low visibility, so the autonomous vehicle can adapt its driving strategy to prioritize safety. V2I communication 221 facilitates the transmission of information on available parking spaces, allowing the vehicle to locate a spot efficiently and thereby minimize congestion caused by circling cars.

In some exemplary embodiments, RSUs 220 can serve as the backbone for data exchange in remote vehicle teleoperation. RSUs 220 facilitate seamless communication between the host vehicle 230 and the RCS 250. In some exemplary embodiments, RSUs 220 can be connected to the RCS 250 via other wired or wireless networks, such as cellular communication networks, dedicated wired or wireless networks, and/or via the internet. Basic RSUs 220 can prioritize reliable data transmission, ensuring a robust connection for critical information exchange. This data can include traffic signal timing, allowing vehicles to optimize speed for a smoother flow through intersections, or real-time alerts on hazards like accidents or disabled vehicles on the road ahead. Some RSUs 220 can incorporate environmental sensors to gather real-time data on weather conditions or traffic flow. This data can be used to dynamically adjust traffic signal timing, for optimizing road capacity and reducing congestion. RSUs can be used for enabling the dissemination of crucial traffic updates or safety warnings directly to drivers and ADAS equipped vehicles. For example, during periods of low visibility due to fog or heavy rain, an RSU 220 can transmit warnings advising drivers to reduce speed and maintain extra following distance.

The RCS 250 can include a workstation and/or user interface from which an operator controls the host vehicle 230 that is physically distant from the RCS 250. The user interface can include joysticks, steering wheels, pedals, buttons, and levers. The workstation can include one or more display monitors for displaying live video feeds from cameras mounted on the vehicle and/or data generated by the host vehicle, such as three-dimensional object maps or the like. This provides the operator with a real-time sense of the surrounding environment, crucial for safe and effective control. Additional displays might show data feeds like speed, battery level, or sensor readings. The RCS 250 can communicate with the host vehicle using a communication link, such as a cellular network or via the RSU 220. Low latency (minimal delay) and high bandwidth are desirable for smooth and responsive control of the host vehicle 230 and reliable communication of video, sensor data and other environmental data from the host vehicle 230 to the RCS 250. The RCS 250 can include additional software functionalities for controlling the vehicle's behavior beyond basic movement, such as autonomous navigation waypoints for pre-programmed movements or activation or configuration of ADAS algorithms to be performed by the host vehicle controller.

In some exemplary embodiments, data transmission issues can occur between the host vehicle 230 and the RSU 250. These data transmission issues can result from signal interference, such as electromagnetic interference from other transmitters, physical barriers, such as buildings, tunnels, or damage to the transmitter or transmitting antenna. In addition, increased latency can reduce responsiveness of the host vehicle systems, making vehicle control sluggish and unresponsive thereby hindering precise control of the host vehicle 230. In addition, increased latency can result in unstable control, as the operator may be controlling the vehicle in response to outdated information. To address this problem, the exemplary host vehicle communications system can reduce the amount of data transmitted between the host vehicle 230 and the RSU 250 in response to a restriction of available bandwidth and/or in response to errors detected in the digital data. Likewise, the RSU 250 and/or the host vehicle controller can initiate ADAS control algorithms in response to detected data corruption, reduction of bandwidth or a detected increase in latency.

The exemplary teleoperation system can be operative to prioritize efficient information delivery by transmitting a processed representation of the vehicle's surroundings in lieu of raw sensor data, such as video streams. In some exemplary embodiments, the optimized data stream can transmit a list of objects identified by on-board processing, eliminating the need for redundant transmission of static elements like road boundaries obtainable from pre-loaded maps. To further enhance bandwidth efficiency, the system can generate bounding boxes around objects and dynamically group nearby objects, transmitting a single data point instead of multiple, and flag missing data when environmental conditions like fog limit sensor effectiveness. This adaptive strategy tailors the information sent based on real-time network conditions and operator preferences, ensuring critical control data is prioritized while minimizing overall data usage.

In some exemplary embodiments, the exemplary teleoperation system can be configured to leverage the host vehicle's inherent ADAS capabilities for enhanced versatility. Integration with these functionalities allows the system to seamlessly transition between remote control and ADAS operation based on pre-defined parameters or operator selection. This enables the system to adapt to diverse environments, such as off-road expeditions and highway commutes. For instance, in an off-road scenario with limited visibility, the system can prioritize transmitting data on large obstacles that hinder progress, while relying on the vehicle's autonomous capabilities for basic navigation. Conversely, on a highway with clear visibility and predictable traffic patterns, the system can transition to a more manual control mode, providing the remote operator with a detailed object list for precise maneuvering. This integration of remote control and autonomous functionalities fosters a highly adaptable and effective system for various operational contexts.

Figure 3:
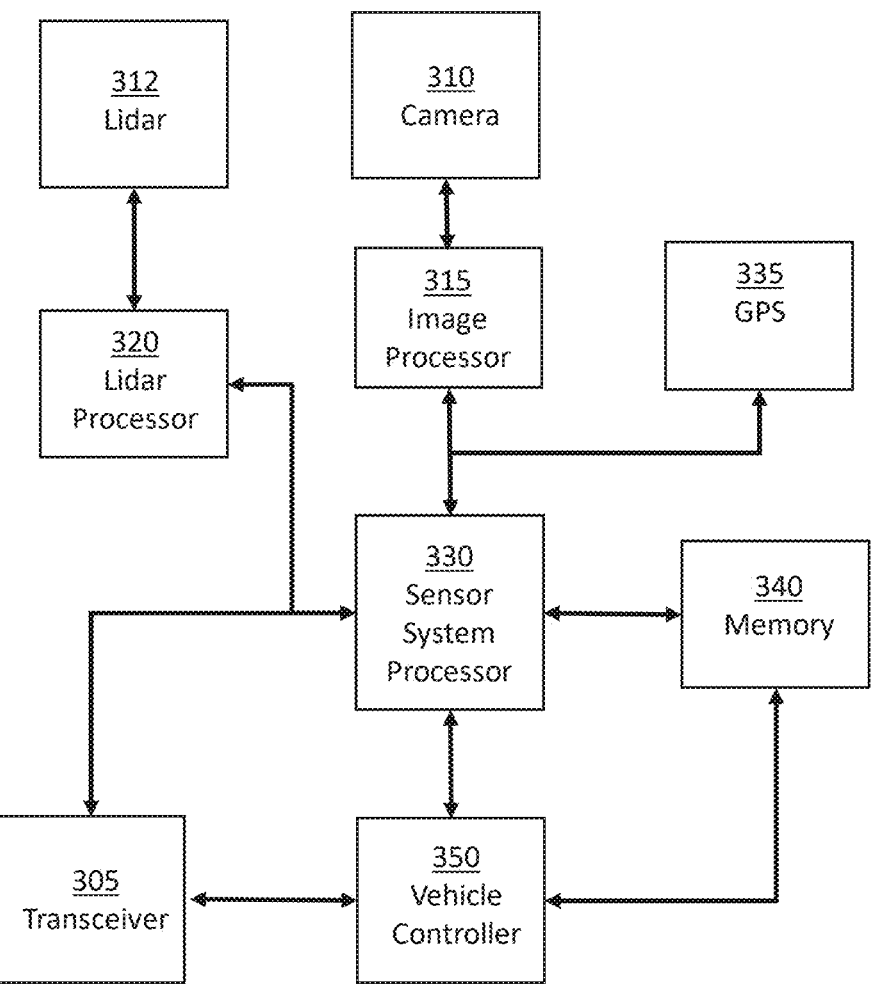
FIG. 3 shows an exemplary block diagram for virtual environment creation for vehicle teleoperation in accordance with various embodiments.

Turning now to FIG. 3, an exemplary block diagram for a vehicle system 300 for control by a vehicle teleoperation is shown in accordance with various embodiments. The exemplary system 300 includes a transceiver 305, a lidar 312, lidar processor 320, a camera 310, an image processor 315, a sensor system processor 330, a memory 340, and a vehicle controller 350.

The lidar 312 is configured to transmit a light pulse at a known angle and elevation and detect the time of propagation of the light pulse. The lidar 312 can then determine a distance to an object at the known angle and elevation in response to the time of propagation. The lidar 312 can repeat this operation for a plurality of angles and elevations to generate a point cloud of depths to objects within the lidar field of view (FOV). Typically, the light pulses are transmitted at regular angle intervals, such as 0.1 degrees and at regular elevation intervals. The larger the number of detection points aggregated in the point cloud, the longer it takes the lidar to complete the scan of the lidar FOV. A lidar point cloud with high density of 3D points requires longer intervals of data capture, but provides higher resolution data with rich features to be utilize in the alignment.

In some exemplary embodiments, the lidar 312 can be configured to couple the detected depths for each of the angles and elevations as individual points or as a point cloud to the lidar processor 320. The lidar processor 320 may generate a 3D contour of target vehicles in response to the points and/or point cloud. In addition, the lidar processor 320 may generate a 3 dimensional representation of the field of view including detection and classification of objects within the field of view.

One or more cameras 310 can be mounted to the host vehicle having a FOV of an area adjacent to the host vehicle, such as a forward FOV, rearward FOV or side FOV. In some exemplary embodiments, images captured by the various cameras 310 can be combined to generate a continuous FOV view. The forward view camera 310 may be mounted inside the vehicle behind the rear view mirror or may be mounted on the front fascia of the vehicle. The cameras 310 may use captured images and/or video which can be used to detect preceding and proximate vehicles, obstacles, lane markers, road surface edges, road surface characteristics, other roadway markings and road hazards during ADAS operation. Images captured by the camera 310 and data generated from the images may be used to augment map data stored in the memory 340. The images captured by the one or more cameras 310 can be coupled to the image processor 315 for object detection. The image processor 315 may run image processing algorithms in response to the image, such as Canny edge detection algorithms for detecting edges within the image as well as RCNN segmentation to detect vehicle contours. These detected edges can then be used to detect object outlines. These object outlines can be used to set boundaries around the detected object as well as to identify and classify the detected objects.

In some exemplary embodiments, the sensor system processor 330, or comparable processor or system for processing sensor data, can receive the two-dimensional edge detected image data from the image processor 315 and the three dimensional point cloud from the lidar processor 320. This data can then be used to calibrate the alignment of the sensors such that, for example, detected objects are determined to be in the same location for each of the sensors. In addition, further processing may be performed to fuse the sensor data and perform other vehicle algorithms in response to the fused data.

The sensor system processor 330 may be further configured to receive the location data from a global positioning system receiver (GPS) 335 and store this location data to the memory 340. The memory 340 may be operative to store map data for use by the sensor system processor 330. The memory 340 may be further operative to store map data wherein the map data may be high definition map data including detailed representations of roadways including precise roadway locations, lane locations, curves, elevations, known lane hazards and other roadway details.

In some exemplary embodiments, the sensor system processor 330 can be configured to monitor network and environmental conditions in order to estimate data transmission capabilities. In response to the network conditions and the environmental conditions, the sensor system processor 330 can generate a virtual environment for transmission to an RCS to provide a visual representation of the three dimensional environment around the host vehicle to a remote teleoperator. In some exemplary embodiments, the sensor system processor 330 can reduce a resolution of the virtual environment to be transmitted in response to a reduced bandwidth of the data transmission network or an increase in bit error rate or the like. Likewise, the sensor system processor 330 may reduce the sensor data being transmitted to the RCS in response to environmental conditions, such as fog, rain, snow, etc. In the case of dense fog, the sensor system processor 330 may elect to not transmit video received from the cameras, and may transmit the lidar depth map, radar data, and/or generate a virtual environment in response to the lidar and radar data to transmission to the RCS. In addition, in response to limited bandwidth or high bit error rate, the sensor system processor 330 may replace object data within the virtual environment with bounding boxes covering the locations of the replaced objects. In some exemplary embodiments, multiple bounding boxes can be clustered into a single bounding box for objects in close proximity to further reduce the data required to be transmitted.

Figure 4:
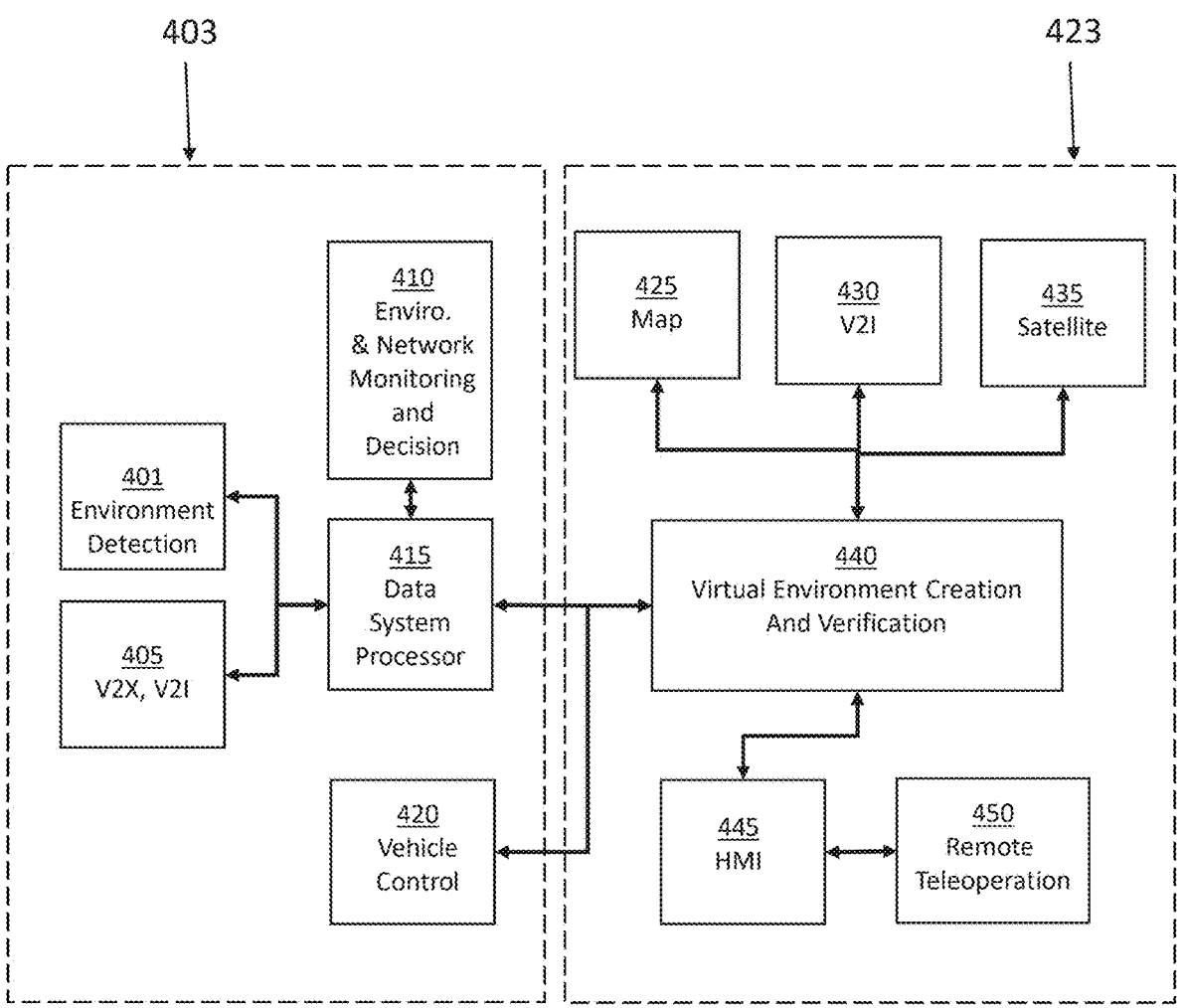
FIG. 4 shows an exemplary decision and data flow diagram for virtual environment creation for vehicle teleoperation in accordance with various embodiments.

Turning now to FIG. 4, a functional block diagram 400 illustrating an exemplary decision and data flow diagram for generating a virtual environment creation for vehicle teleoperation in accordance with various embodiments is shown. The function block diagram can generally be divided into in-vehicle functions 403 and RSU functions 423. In some exemplary embodiments, the in-vehicle functions 403 can include environment detection 401, acquisition of additional data 405, environment and network monitoring and decision making 410, data processing 415 and vehicle control 420. The RSU functions 423 can include acquisition of map data 425, acquisition of V2I data 430, acquisition of satellite data 435, virtual environment creation and verification 440, human machine interface (HMI) 445 and remote teleoperation 450.

The exemplary in-vehicle functions 403 and the RSU functions 423 are operative to perform a virtual environment creation based on raw and metadata for vehicle remote teleoperation. Vehicle remote teleoperation using a virtual environment facilitates control of a host vehicle wherein the remote operator is immersed in a realistic, real-time virtual environment replicating the surroundings of the host vehicle. To address challenges such latency and safety, the exemplary system and methods for operating a vehicle by a remote teleoperator creates the virtual environment considering the data network congestions, optimizing the perceived environment representation, and performing verification on the created virtual environment.

The in-vehicle functions 403 and in-vehicle systems are configured to detect an environment 401 around the host vehicle. This environment can be detected using vehicle sensors, such as radar and/or lidar, cameras and the like. The detection 401 can include detection of static objects, such as buildings or parked vehicles, and dynamic objects, such as pedestrians or moving proximate vehicles. Additional information is acquired 405 via V2I, V2V and/or vehicle to everything (V2X) communications networks. This additional information can include data related to the surrounding objects, such as location and velocity of proximate vehicles, locations of permanent static objects, such as crosswalks, curbs, light posts, etc.

The vehicle perception function 415 is then configured to merge the various sensor data and other received data to construct a real-time, three-dimensional environment and object map. A three dimensional point cloud can be constructed from a collection of depth measurements from the lidar system. Complementary radar technology can continuously transmit radio waves, enabling the detection of nearby objects (including other vehicles and pedestrians) along with their relative position and velocity. Cameras, acting as the visual perception system, capture critical data on lane markings, traffic signals, and visual details for object identification. To transform this raw sensory data into a usable map, advanced algorithms such as simultaneous localization and mapping (SLAM) to fuse the information from each sensor, constantly refining the three dimensional environment map in real-time.

The environment and network monitoring and decision making 410 function can be operative to monitor both communication network health and environmental conditions proximate to the host vehicle. Communication network health can be characterized by monitoring of critical metrics such as signal strength, throughput monitoring. Signal strength, measured by received signal strength indicator (RSSI), is evaluated for both individual devices and access points to identify potential coverage gaps or weak signal zones. Coverage analysis tools further pinpoint dead zones, while ping sweeps provide a comprehensive view of connected clients and flag potential rogue devices. Throughput monitoring tracks data transfer rates, helping to isolate bottlenecks and congested areas. Packet loss analysis investigates the integrity of data transmissions, uncovering potential sources of interference or overloaded access points. Environmental conditions, such as fog, rain, snow, etc.

In response to the network health and the weather conditions, the data processing function 415 can determine which data to transmit to the RCS 423 in response to the latency and network health in order to provide the remote operator with sufficient data to ensure successful vehicle operation. For example, in foggy conditions, the data processing function 415 can determine that video streaming would not be useful to a remote operator and that the three-dimensional environment map would be more suitable. Likewise, if a host vehicle sensor is experiencing an error condition, the data from that sensor may be omitted from the data transmission to the RCS 423. In some exemplary embodiments, the data processing function 415 can reduce the resolution of the three-dimensional environment map in respond to reduced network bandwidth or reduced data transfer rate. Likewise, objects within the three-dimensional environment map can be represented as bounding boxes around the object location thereby reducing the amount of data to be transmitted. In some exemplary embodiments, with extreme limited communications bandwidth, multiple objects can be combined into a single cluster such that the three-dimensional environment map includes several clusters. Clusters can be determined in response to overlapping objects or objects having a space between them not being wide enough for the host vehicle to pass through. For example, a row of parked cars can be clustered into a single bounding box. Clustering can be further generated in response to host vehicle information, such as vehicle speed, steering angle, location and optimized field of view, such as for turning left, right side information may be redundant and can be clustered.

Once the appropriate data to transmit is determined, data processing function 415, the data is transferred to the virtual environment creation and verification function 440. The virtual environment creation and verification function 440 is performed at the RCS 423 and is configured to generate a virtual environment for display on the HMI 445 to enable the remote teleoperation. 450. The virtual environment creation and verification function 440 can use map data 425, such as google map data and/or HD map data, with V2I data and satellite data 435 and/or imagery to determine locations of static objects, such as road boundaries, building, roadside construction etc.

In some exemplary embodiments, the remote teleoperator 450 can determine what data is transmitted from the data system processor 415 via inputs at the HMI 455. Fox example, if video data is choppy, has a high latency, or has poor resolution, the remote teleoperator 450 can opt to receive a virtual environment created by the data system processor 415. In some exemplary embodiments, with surrounding objects projected position, what data to transmit can be calculated by the logic that considers the network latency, speed of the ego vehicle and estimated speed of other surrounding objects. The request could then be sent to the data system processor 415 to transmit only the sensor data required by the virtual environment create and verification function 440 to create the virtual environment for display by the HMI 445.

The HMI 445 can further include user inputs for remote control of the host vehicle 403 by the remote teleoperator 450. The HMI 445 can include a display, such as a computer screen or virtual reality device to display the generated virtual environment including a received object list, video or a combination of both to the remote teleoperator 450. The exemplary HMI 445 can further display a trajectory of the host vehicle for the current steering, brake and throttle inputs for a defined duration of time. The HMI 4445 can include steering inputs which read control signals from a steering device, such as a steering wheel or controller, sending the steering signals and steering device names to the host vehicle control 420 function. Likewise, throttle pedal position and brake pedal position inputs at the HMI 445 can be transmitted to the host vehicle control 420 function. In some exemplary embodiments, the HMI 445 can further include a shifter input to control a transmission within the host vehicle 403 and/or an emergency stop for stopping the host vehicle when needed.

Figure 5:
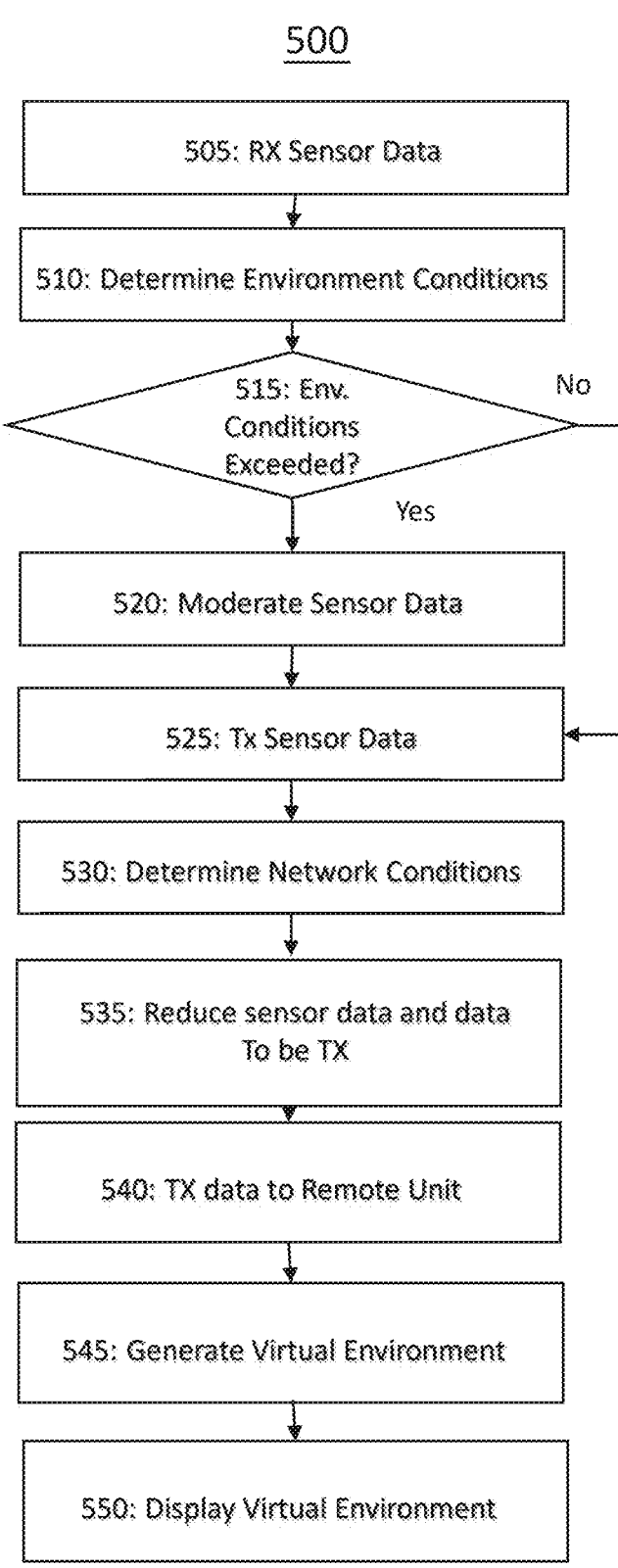
FIG. 5 shows a flowchart illustrating a method for virtual environment creation for vehicle teleoperation is shown in accordance with various embodiments.

Turning now to FIG. 5, a flow chart illustrating an exemplary implementation of a method 500 for generating a virtual environment creation for vehicle teleoperation in accordance with various embodiments is shown. The method 500 can be performed by a microprocessor or controller in a host vehicle configured to generate data for transmission to an RCS. The method 500 is first configured to receive data from various host vehicle sensors, such as lidar, radar, cameras, internal measurement units (IMU) and the like. Likewise, the method 500 can receive data from a memory, such as map data, and data from other vehicles or infrastructure, such as via V2V and V2I communication networks.

In response to the received data, the method 500 next determines environmental conditions proximate to the host vehicle. These environmental conditions can include fog, rain, snow, temperature, and ambient light level. Some environmental conditions can be determined directly from a corresponding sensor data, such as temperature, humidity, and ambient light level from an onboard thermometer, hygrometer, and light sensor respectively. In addition, environmental conditions can be presumed in response to sensor other sensor data, such as camera images, lidar data or the like. For example, dense fog can be presumed in response to a fully saturated image and lidar depth data not being indicative of an object proximate to the camera within the camera FOV.

In response to the environmental conditions, the method 500 can next determine if 515 any environmental conditions are exceeded which would render some of the sensor data unusable. If none of the environmental conditions are exceeded, the method 500 transmits the default sensor data 525. If one or more of the environmental conditions are exceeded, the method then moderates the sensor data 520 and determines which sensor data to offload from the data to be transmitted to the RCS. For example, in the case of dense fog, the image data would not be usable by the RCS can be offloaded from the transmitted data. Once the data to be transmitted is moderated in light of the exceeded environmental conditions, the method 500 then transmits the moderated sensor data 525 to the RCS.

In response to transmitting the sensor data and receiving control data from the RCS, the method 500 determines network conditions between the host vehicle and the RCS. The network conditions can be determined in response to an analysis of key network performance indicators (KPIs). Bandwidth utilization, measured as a percentage of the network's capacity being consumed, provides a vital understanding of resource allocation. Latency, the time for data to travel across the network, is crucial for real-time applications. Packet loss, the rate of data packets failing to reach their destination, significantly impacts data integrity. Monitoring device connectivity and analyzing traffic patterns further pinpoint potential bottlenecks and congestion points.

In response to the determined network health, the method 500 can next modulate sensor data and other data to be transmitted to the RCS. For example, for reduced bandwidth, video can be omitted from the transmitted data and only lidar depth data and radar data can be transmitted. This transmitted data can then be used by the RCS to generate a virtual environment with corrected objects position projected based on the network latency calculations for display to a remote vehicle operator. Likewise, object lists for static and dynamic objects can be modulated to include only bounding boxes for certain objects. To further reduce the data being transmitted, objects can be clustered when they are close together or are in an area not likely to be traversed by the host vehicle. This cluster bounding box information can then be transmitted to the RCS for use in generating the virtual environment.

In some exemplary embodiments, ADAS systems within the remote teleoperated host vehicle can be enabled in response to severely degraded network health and/or network performance. For example, for highway operation, lane centering and adaptive cruise control can be enabled for a limited duration of time during severely degraded network conditions such that a sufficient virtual environment cannot be generated for display to the remote teleoperator or in the case of loss of connection with vehicle control data from the RCS. In some exemplary embodiments, a safe shutdown operation can be initiated in the case of loss of communication wherein the host vehicle ADAS controls the host vehicle to a safe stopping location.

Once the required data is modulated in response to the current network health, the modulated data is then transmitted 540 to the RCS. The modulated data can then be used with transmitted sensor data to generate a virtual environment 545 by the RCS. The virtual environment can then be displayed 550 to a remote user for use in remote teleoperation of the host vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus for generating a virtual environment for use in control of a host vehicle comprising:

an environmental sensor for detecting an environmental condition proximate to the host vehicle, wherein the environmental condition includes a measure of environmental visibility and image saturation;

a sensor configured to generate a sensor data representative of an environment proximate to the host vehicle;

a camera configured to capture an image representative of the environment proximate to the host vehicle;

a processor configured to;

determine a network condition;

generate a modulated data including the image and the sensor data in response to the environmental condition being less than an environmental threshold value and the network condition exceeding a network threshold condition;

generate the modulated data without the image in response to at least one of the environmental condition exceeding the environmental threshold value and the network condition not exceeding the network threshold condition;

wherein the modulated data without the image comprises the virtual environment including a plurality of bounding boxes representing objects detected in the sensor data;

wherein a size of each of the plurality of bounding boxes is inversely proportional to a magnitude of the network condition;

generate a predictive trajectory of the host vehicle for a defined duration of time based on current steering, brake, and throttle inputs and wherein the modulated data includes the predictive trajectory for display on a remote control station alongside the virtual environment and wherein the modulated data includes an object list and wherein at least one of a plurality of objects listed in the object list are represented as one of the plurality of bounding boxes representing a cluster of objects within the environment proximate to the host vehicle and wherein the one of the plurality of bounding boxes representing the cluster of objects is determined in response to at least one of a spatial gap between each object in a cluster of objects being less than a width required for the host vehicle to pass through and a host vehicle operational parameter selected from a group consisting of vehicle speed, steering angle, and an optimized field of view for a detected turning maneuver; and wherein the processor is further configured to cluster a plurality of proximate objects into a single bounding box within the modulated data when the network condition is below a clustering threshold;

a transceiver configured to transmit the modulated data to the remote control station and receive a vehicle control data from the remote control station; and a vehicle controller for controlling the host vehicle in response to the vehicle control data, the vehicle controller configured to automatically transition from a remote teleoperation mode to an onboard advanced driver assistance system (ADAS) mode in response to the network condition falling below a critical safety threshold.

2. The apparatus of claim 1 wherein the processor is further configured to generate the virtual environment in response to the sensor data and wherein the modulated data includes the virtual environment for display on the remote control station.

3. The apparatus of claim 1 wherein a resolution of the virtual environment is determined in response to the magnitude of the network condition.

4. The apparatus of claim 1 wherein the environmental condition is a visibility determined in response to the image.

5. The apparatus of claim 1 wherein the network condition is a bandwidth of a communications network.

6. The apparatus of claim 1 wherein the network condition is a bit error rate of a communications network.

7. The apparatus of claim 1 wherein the modulated data includes the object list and wherein each of a plurality of objects listed in the object list are represented as one of the plurality of bounding boxes.

8. A method for generating a virtual environment for use in control of a host vehicle comprising:

generating, via a sensor, sensor data representative of an environment proximate to the host vehicle;

determining an environmental condition in response to the sensor data, wherein the environmental condition includes a measure of environmental visibility and image saturation;

determining a network condition in response to a transceiver performance data;

capturing an image of the environment proximate to the host vehicle;

generating, by a processor, a modulated data including the image and the sensor data in response to the environmental condition being less than an environmental threshold value and the network condition exceeding a threshold network performance level;

generating the modulated data without the image in response to at least one of the environmental condition exceeding the environmental threshold value and the network condition not exceeding the threshold network performance level;

wherein the modulated data without the image comprises the virtual environment including a plurality of bounding boxes representing objects detected in the sensor data;

wherein a size of each of the plurality of bounding boxes is inversely proportional to a magnitude of the network condition;

generating a predictive trajectory of the host vehicle for a defined duration of time based on current steering, brake, and throttle inputs and wherein the modulated data includes the predictive trajectory for display on a remote control station alongside the virtual environment and wherein the modulated data includes an object list and wherein at least one of a plurality of objects listed in the object list are represented as one of the plurality of bounding boxes representing a cluster of objects within the environment proximate to the host vehicle and wherein the one of the plurality of bounding boxes representing the cluster of objects is determined in response to at least one of a spatial gap between each of the cluster of objects being less than a width required for the host vehicle to pass through and a host vehicle operational parameter selected from a group consisting of vehicle speed, steering angle, and an optimized field of view for a detected turning maneuver; and wherein the method further includes clustering a plurality of proximate objects into a single bounding box within the modulated data when the network condition is below a clustering threshold;

transmitting the modulated data to the remote control station;

receiving a vehicle control data from the remote control station; and controlling, via a vehicle controller, the host vehicle in response to the vehicle control data.

9. The method of claim 8 wherein generating the modulated data further includes generating the virtual environment in response to the sensor data and wherein the modulated data includes the virtual environment for display on the remote control station.

10. The method of claim 8 wherein a resolution of the virtual environment is determined in response to the magnitude of the network condition.

11. The method of claim 8 wherein the measure of environmental visibility is determined in response to a saturation level of the image.

12. The method of claim 8 wherein the modulated data includes the object list and wherein each of a plurality of objects listed in the object list are represented as one of the plurality of bounding boxes.

13. The method of claim 8 wherein the network condition is determined in response to a network condition indicator received from the remote control station.

14. The method of claim 8 wherein the modulated data is further generated in response to a request from the remote control station to exclude the image from the modulated data.

15. A system for generating a virtual environment for use in a vehicle remote teleoperation system for control of a host vehicle comprising:

an environmental sensor for detecting an environmental condition proximate to the host vehicle, wherein the environmental condition includes a measure of environmental visibility and image saturation;

a sensor configured to generate a sensor data representative of an environment proximate to the host vehicle;

a camera configured to capture an image data representative of the environment proximate to the host vehicle;

a processor configured to:

determine a network condition;

generate a modulated data including the image data and the sensor data in response to the environmental condition being less than an environmental threshold value and the network condition exceeding a network threshold condition; and generate the modulated data without the image data in response to at least one of the environmental condition exceeding the environmental threshold value and the network condition not exceeding the network threshold condition;

wherein the modulated data without the image data comprises the virtual environment including a plurality of bounding boxes representing objects detected in the sensor data;

wherein a size of each of the plurality of bounding boxes is inversely proportional to a magnitude of the network condition;

generate a predictive trajectory of the host vehicle for a defined duration of time based on current steering, brake, and throttle inputs and wherein the modulated data includes the predictive trajectory for display on a remote control station alongside the virtual environment and wherein the modulated data includes an object list and wherein at least one of a plurality of objects listed in the object list are represented as one of the plurality of bounding boxes representing a cluster of objects within the environment proximate to the host vehicle and wherein the one of the plurality of bounding boxes representing the cluster of objects is determined in response to at least one of a spatial gap between each of the cluster of objects being less than a width required for the host vehicle to pass through and a host vehicle operational parameter selected from a group consisting of vehicle speed, steering angle, and an optimized field of view for a detected turning maneuver; and wherein the processor is further configured to cluster a plurality of proximate objects into a single bounding box within the modulated data when the network condition is below a clustering threshold;

a transceiver configured to transmit the modulated data to the remote control station and receive a vehicle control data from the remote control station; and a vehicle controller for controlling the host vehicle in response to the vehicle control data, the vehicle controller configured to automatically transition from a remote teleoperation mode to an onboard advanced driver assistance system (ADAS) mode in response to the network condition falling below a critical safety threshold.

16. The system for generating the virtual environment for use in the vehicle remote teleoperation system for control of a host vehicle of claim 15 wherein the plurality of bounding boxes are generated in response to data included in the object list.

* * * * *